United States Patent
Piirainen

(10) Patent No.: US 6,327,315 B1
(45) Date of Patent: Dec. 4, 2001

(54) METHOD FOR ESTIMATING IMPULSE RESPONSE, AND RECEIVER

(75) Inventor: Olli Piirainen, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/194,040

(22) PCT Filed: May 20, 1997

(86) PCT No.: PCT/FI97/00295

§ 371 Date: Nov. 20, 1998

§ 102(e) Date: Nov. 20, 1998

(87) PCT Pub. No.: WO97/44916

PCT Pub. Date: Nov. 27, 1997

(30) Foreign Application Priority Data

May 21, 1996 (FI) ......................................................... 962140

(51) Int. Cl.[7] .......................... H04L 27/38; H04L 27/06; H04B 7/005
(52) U.S. Cl. .............................................. 375/340; 370/347
(58) Field of Search .................................. 375/340, 368, 375/252, 232, 316; 370/342, 347

(56) References Cited

U.S. PATENT DOCUMENTS

| 5,204,878 | 4/1993 | Larsson . |
| 5,297,169 | 3/1994 | Backstrom et al. . |
| 5,303,263 | 4/1994 | Shoji et al. . |
| 6,130,909 | * 10/2000 | Anvari et al. ........................ 375/232 |
| 6,141,393 | * 10/2000 | Thomas et al. ...................... 375/347 |
| 6,151,358 | * 11/2000 | Lee et al. ............................. 375/323 |
| 6,154,507 | * 11/2000 | Bottomley ........................... 375/340 |
| 6,195,402 | * 2/2001 | Hiramatsu ........................... 375/368 |

FOREIGN PATENT DOCUMENTS

| 535 403 | 4/1993 | (EP) . |
| 605 955 | 7/1994 | (EP) . |
| 2 247 812 | 3/1992 | (GB) . |
| 470 371 | 1/1994 | (SE) . |

OTHER PUBLICATIONS

Patent Abstract of Japan 07095107, M. Namekata.

* cited by examiner

Primary Examiner—Don N. Vo
Assistant Examiner—Dung X. Nguyen
(74) Attorney, Agent, or Firm—Pillsbury Winthrop LLP

(57) ABSTRACT

A method for estimating an impulse response and a receiver in a radio system where the signal to be sent comprises a known training sequence, which receiver comprises means for sampling the received signal, and means for calculating a first estimate for the impulse response by means of the known training sequence. To enable an accurate determination of impulse response, the receiver comprises means for making preliminary decisions of the received samples by means of the first impulse response estimate, means for calculating an error value of the estimated samples and the received samples calculated by means of the preliminary decisions, means for calculating a second estimate of the impulse response by minimizing said error value, and means for calculating a new estimate for the impulse response by combining the first and second estimates to one another.

11 Claims, 1 Drawing Sheet

METHOD FOR ESTIMATING IMPULSE RESPONSE, AND RECEIVER

This application is the national phase of International application PCT/FI97/00295 filed May 20, 1997 which designated the U.S.

FIELD OF THE INVENTION

The present invention relates to a method for estimating an impulse response in a digital radio system, where the signals to be transmitted comprise bursts formed of symbols, which bursts comprise a known training sequence, in which method the received signal is sampled, and a first estimate is calculated for the impulse response by means of the known training sequence.

BACKGROUND OF THE INVENTION

In a typical cellular radio environment, the signals between a base station and a subscriber terminal equipment propagate on several routes between a transmitter and a receiver. This multi-path propagation is mainly caused by signal reflections from surrounding surfaces. Signals travelling on different routes arrive at the receiver at different times because of a different propagation delay. This holds true for both directions of transmission. The multi-path propagation of a signal can be monitored in a receiver by measuring an impulse response of the received signal, signals arriving at different times being visible as peaks proportional to their signal strength. FIG. 1 illustrates a measured impulse response by way of example. Time is on a horizontal axis 100 and the strength of the received signals is on a vertical axis 102. Peaks 104, 106, 108 of the curve indicate the strongest multi-path propagated components of the received signal.

In prior art solutions the impulse response is estimated by means of a known training sequence added to the burst. FIG. 2 illustrates by way of example a normal burst of the GSM system comprising start and end bits 200, 202, actual data in two parts 204, 206 and a known training 208 sequence placed in the middle of the burst. In a normal burst, the length of the training sequence is 26 bits. In known solutions, such as in the GSM system, the impulse response is estimated by cross-correlating the received samples with a known training sequence. 16 bits of a 26-bit-long training sequence are used for estimating each impulse response tap. When the quality of the received signal is poor, it is difficult to attain a reliable estimation result with known methods. This will impair the performance of the receiver.

CHARACTERISTICS OF THE INVENTION

The object of the present invention is to accomplish a more accurate method than the present methods for estimating an impulse response.

This will be attained with a method as shown in the preamble, which is characterized by making preliminary decisions by means of the first impulse response estimate, calculating an error value of the estimated samples and the received samples calculated by means of the preliminary decisions, calculating a second estimate of the impulse response by minimizing said error value, calculating a new estimate for the impulse response by combining the first and second estimates to one another, and by using the estimate obtained in this way when estimating the received sequence again. The present invention also relates to a receiver in a digital radio system where the signals to be sent comprise bursts formed of signals, which bursts comprise a known training sequence, which receiver comprises means for sampling the received signal, and means for calculating a first estimate for the impulse response by means of the known training sequence. The receiver of the invention is characterized in that the receiver comprises means for making preliminary decisions of the received samples by means of the first impulse response estimate, means for calculating an error value of the estimated samples and the received samples calculated by means of the preliminary decisions, means for calculating a second estimate of the impulse response by minimizing said error value, means for calculating a new estimate for the impulse response by combining the first and second estimates to one another, and means for estimating the received sequence again by using the estimate obtained in this way.

The method and the receiver of the invention have several advantages in comparison with prior art solutions. The accuracy of the impulse response estimate is greater in the solution of the invention than in prior art methods. Furthermore, if the speed of the terminal equipment is high, the training sequence in the middle of the burst cannot alone give a correct picture of the impulse response as the impulse response may change even during a burst. With the solution of the invention, it is possible to calculate an impulse response separately for the start portion of the burst and for the end portion of the burst.

BRIEF DESCRIPTION OF THE FIGURES

In the following, the invention will be explained in more detail with reference to the examples of the appended drawings, wherein.

DESCRIPTION OF THE PREFERRED EMBODIMENTS

The invention can be applied to any digital radio system where a burst comprises a training sequence. One example of this kind of a system is the GSM cellular radio system, and in the following, it is used as an example when explaining the invention without restricting thereto.

In the solution of the invention, the impulse response of a channel is estimated adaptively and in multi-phase. At first, a first preliminary estimate is calculated for the impulse response, by means of which a preliminary bit decision is made. After this, an error value of the estimated samples and the received samples calculated by means of the preliminary decisions is calculated, and a second estimation of the impulse response is calculated by minimizing said error value. In the preferred embodiment of the invention, the error value between the estimated samples and the received samples is calculated by forming first a convolution between the preliminary decisions and the first impulse response estimate and by summing the squared differences of the received samples and the estimated samples.

After this, the first and second impulse response estimates are combined. In the preferred embodiment of the invention, the first and second impulse response estimates are combined to one another by weighting the estimates by coefficients according to their lengths and by summing the received estimated tap values to one another. The actual detection will be carried out by using the impulse response obtained in this way.

Figure 1:
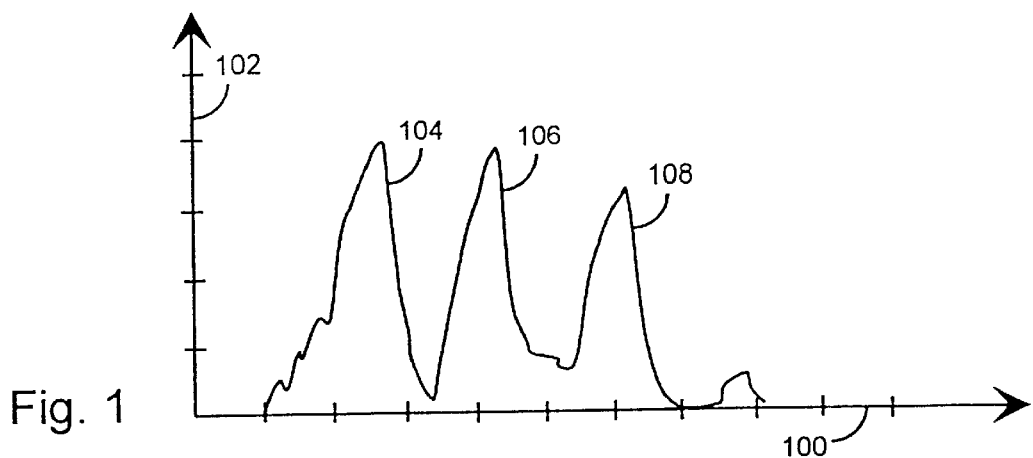
FIG. 1 shows an example explained above of the impulse response of a received signal.
Figure 2:
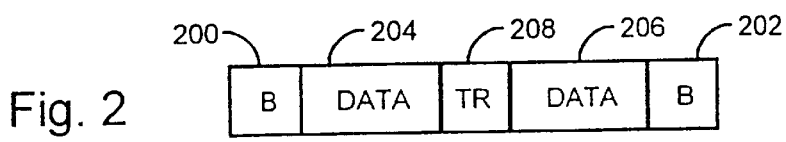
FIG. 2 shows a normal burst of the GSM system.
Figure 3:
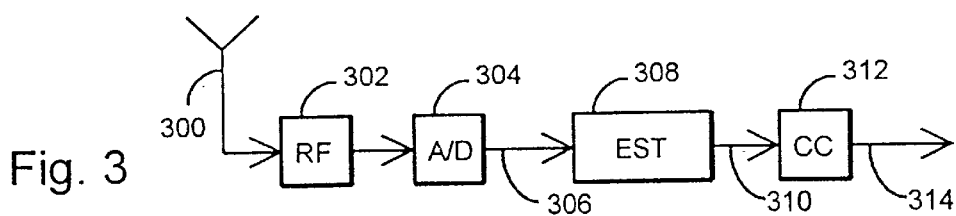
FIG. 3 illustrates the structure of the receiver of the invention by means of a block diagram.

In the following, let us examine the structure of the receiver of the invention which is illustrated with relevant parts in the block diagram of FIG. 3. Both the base station and the subscriber terminal equipment may operate as receivers of the invention. The receiver comprises an antenna 300, a signal received with which is conveyed to radio frequency parts 302 where the signal is converted to an intermediate frequency. From the radio parts, the signal is taken to converter means 304 where the signal is converted from an analog form into a digital form by sampling. A digital signal 306 propagates to means 308 where the impulse response of the channel is estimated and detection is carried out by utilizing a Viterbi detector, for example. The detected signal is further conveyed to a channel decoder 312 and onwards 314 to other parts of the receiver. As is obvious to those skilled in the art, the receiver of the invention naturally comprises also other components than the ones described above, such as filters, but they are irrelevant to the invention and they have not been described for the sake of clarity.

Figure 4:
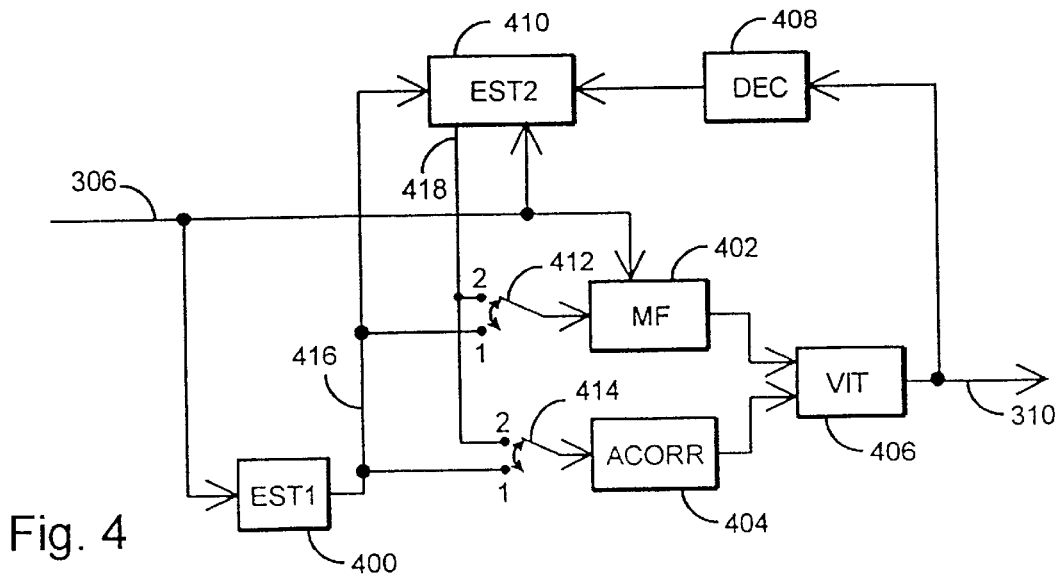
FIG. 4 illustrates in detail an example of the application of impulse response estimation.

Let us examine next in more detail an example of the structure of the estimation block 308 which is illustrated with relevant parts in the block diagram of FIG. 4. A received sampled signal 306 arrives at the estimation block as an input. The sampled signal is conveyed to a first estimation means 400 where a first estimate of the impulse response is calculated with prior art methods by cross-correlating the samples with a training sequence. The first estimation block can be realized with methods known to those skilled in the art.

A first estimate 416 of the impulse response is conveyed to a filter 402 adapted by means of switches 412 and 414 and to a means 404 where autocorrelation taps are calculated. At this stage the switches 412 and 414 are in position 1. The received sampled signal 306 is also as an input of the adapted filter. The adapted filter 402 restores the signal distorted in the channel into an original data stream by symbol error probability depending on interference factors, such as interference caused by adjacent received bits. The autocorrelation taps of the estimated impulse response of the channel are formed of impulse response information with a means 404. The procedures described above can be realized by general and signal processors or by a detached logic circuit, for example.

The outputs of the adapted filter 402 and the calculation means 404 are conveyed to a prior art equalizer 406, preferably to a Viterbi equalizer. An output 310 of Viterbi 406 is conveyed to a decision means 408, where hard bit decisions are made on the basis of the first impulse response.

The output of the decision means 408 is coupled to an input of a second estimator 410. The received sampled signal 306 and the first estimate 416 of the impulse response are also as an input of the second estimator 410. In the second estimator, a second estimate is calculated for the impulse response by means of the bit decisions and the received signal, and the first and second impulse response estimates are combined to one another. The second estimator can be realized by general and signal processors or by a detached logic circuit, for example. An estimate 418 obtained in this way is conveyed to the filter 402 adapted by means of the switches 412 and 414 and to the means 404 where the autocorrelation taps are calculated. At this stage the switches 412 and 414 are in position 2. On the basis of more exact impulse response information, the adapted filter 412 and the calculation means 414 calculate new values that are conveyed to the Viterbi equalizer 406 from which the signal is taken to other parts of the receiver.

The calculation of the second impulse response estimate of the invention is now examined in more detail. In the method of the invention, the squared error of samples is minimized by means of the received samples and the first impulse response estimate. The estimated samples are calculated as a convolution from hard bit decisions. It is assumed that a 5-bit impulse response is used, in which case the received bits are $$X_k = (x_k, x_{k-1}, x_{k-2}, x_{k-3}, x_{k-4})^T; x \in \{-1,1\}$$

and the estimated impulse response is $$W = (h_0\ h_1\ h_2\ h_3\ h_4)^T.$$

Therefore the estimated samples will be obtained now:

$$Y = W^T X_k.$$

The error of the estimated samples will be determined next in comparison with the received samples. The error can be calculated as a squared error, taking into account N bits at a time in the calculation. The error function can be formulated as follows:

$$e^2 = \sum_{k=j}^{j+N} (y(k) - Y)^2,$$

where y(k) has received the samples and j is the beginning of a bit sequence being examined. A square of error, (MSE, minimum squared error) is thus used above as an error value. The error calculated in this way is minimized. The minimization can be carried out with various different methods described in the relevant literature, such as LMS, Kalman, direct matrix inversion, etc. For example, in the LMS method a gradient is taken from the function defined above and a solution is searched iteratively from the direction of the gradient. In principle, the square of the difference can be minimized by means of the mere difference without calculating the actual square. A new impulse response estimate will be obtained by means of the following formula:

$$W_{t+1} = \frac{\sum_{k=j}^{j+N} W_c + 2\mu e_k X_k}{N}$$

$$e_k = y(k) - Y$$

where $\mu$ is a constant between (0,1).

With value t=0, corresponding $W_0$ is the previously estimated first impulse response estimate W. This iterative formula can be repeated a desired number of times and after each repetition, an updated impulse response estimate can be obtained. It is assumed here that there are c times of repetitions, in which case the second impulse response estimate will thus be $W_c$.

In the following, the first and second impulse response estimates are combined by weighting the estimates by coefficients according to their lengths and by summing the corresponding estimated tap values with one another. Summing can be described with a formula $$W_{tot} = \frac{m * W_0 + N * W_c}{m + N},$$

where m is the length of the bit sequence used in calculating the first impulse response estimate (that is, half of a training sequence, 16 in the case of GSM) and N is the length of the bit sequence used in calculating the second impulse response estimate.

The impulse response estimate $W_{tot}$ obtained in this way is used in the adapted filter and in the calculation of autocorrelation taps, and final bit decisions are calculated by means of it.

It is also possible to calculate the impulse response estimate again a desired number of times by using the impulse response estimate $W_{tot}$ as an initial value when calculating new estimated samples and by minimizing the squared difference again.

With the solution of the invention, it is also possible to calculate an impulse response separately for the start portion of the burst and for the end portion of the burst. Then a more accurate result will be obtained especially if the speed of the terminal equipment is high. The first impulse response estimate is calculated by means of the training sequence in the middle of the burst, and the other impulse response estimates are calculated separately for the start portion of the burst and for the end portion of the burst.

Although the invention is explained above with reference to the example of the accompanying drawings, it is evident that the invention is not restricted thereto, but it can be modified in various ways within the inventive idea disclosed in the appended claims.

What is claimed is:

1. A method for estimating an impulse response in a digital radio system, wherein signals to be transmitted comprise bursts formed of symbols, said bursts comprising a known training sequence in which a received signal is sampled, and a first estimate is calculated for the impulse response by means of the known training sequence comprising:
   making preliminary bit decisions of received samples by means of the first impulse response estimate;
   calculating estimated samples from the preliminary bit decisions;
   calculating an error value of the received samples and the estimated samples;
   calculating a second estimate of the impulse response by minimizing said error value; and
   calculating a new estimate for the impulse response by combining the first and second estimates; and
   using the new estimate when estimating the received sequence again.

2. The method of claim 1, wherein the second estimate is calculated iteratively a desired number of times by using the new estimate as an initial value when making preliminary decisions.

3. The method of claim 1, wherein the first and second estimates are combined by weighting the estimates by coefficients according to their lengths and summing estimated tap values.

4. The method of claim 1, wherein the error value is calculated by first forming the estimated decisions by calculating a convolution between the preliminary bit decisions and the first impulse response estimate and by summing the squared differences of each of the received samples and the estimated samples.

5. The method of claim 1, wherein the second estimate is calculated separately for a start portion of the burst and for an end portion of the burst.

6. A receiver in a digital radio system wherein signals to be sent comprise bursts formed of symbols, said bursts comprising a known training sequence, said receiver comprises means for sampling a received signal, and means for calculating a first estimate for an impulse response by means of the known training sequence, wherein the receiver comprises:
   means for making preliminary bit decisions of received samples by means of the first impulse response estimate;
   means for calculating estimated samples from the preliminary decisions;
   means for calculating an error value of the estimated samples and the received samples;
   means for calculating a second estimate of the impulse response by minimizing said error value;
   means for calculating a new estimate for the impulse response by combining the first and second estimates; and
   means for estimating the received sequence again by using the new estimate.

7. The receiver of claim 6, wherein the receiver comprises means for combining the first and second estimates by weighting the estimates by coefficients according to their lengths and by summing corresponding estimated tap values.

8. The receiver of claim 6, wherein the receiver comprises means for forming estimated decisions by calculating a convolution between bit values of the preliminary bit decisions and the first impulse response estimate and by summing the squared difference of each of the received samples and the estimated samples.

9. A receiver in a digital radio system wherein signals to be sent comprise bursts formed of symbols, said bursts comprising a known training sequence, said receiver comprises a converter for sampling a received signal, and an estimator for calculating a first estimate for an impulse response by means of the known training sequence, wherein the receiver comprises:
   an equalizer and processor for making preliminary bit decisions of received samples by means of the first impulse response estimate;
   an estimator for calculating estimated samples form the preliminary bit decisions;
   an estimator for calculating an error value of the estimated samples and the received samples;
   an estimator for calculating a second estimate of the impulse response by minimizing said error value;
   an estimator for calculating a new estimate for the impulse response by combining the first and second estimates; and
   an estimator for estimating the received sequence again by using the new estimate.

10. The receiver of claim 9, wherein the receiver comprises an estimator for combining the first and second estimates to one another by weighting the estimates by coefficients according to their lengths and by summing corresponding estimated tap values.

11. The receiver of claim 9, wherein the receiver comprises a estimator and processor for forming estimated decisions by calculating a convolution between the preliminary bit decisions and the first impulse response estimate and by summing the squared difference of each of the received samples and the estimated samples.

* * * * *